No. 872,467. PATENTED DEC. 3, 1907.
A. SMITH.
SIDE DELIVERY BUNCHER.
APPLICATION FILED APR. 6, 1907.

2 SHEETS—SHEET 1.

No. 872,467. PATENTED DEC. 3, 1907.
A. SMITH.
SIDE DELIVERY BUNCHER.
APPLICATION FILED APR. 6, 1907.

2 SHEETS—SHEET 2.

Witnesses
G. Howard Walmsley,
Edward L. Reed.

Inventor
Amos Smith,
By ...........,
Attorney

UNITED STATES PATENT OFFICE.

AMOS SMITH, OF VIENNA CROSS ROADS, OHIO.

SIDE-DELIVERY BUNCHER.

No. 872,467.  Specification of Letters Patent.  Patented Dec. 3, 1907.

Application filed April 6, 1907. Serial No. 366,707.

*To all whom it may concern:*

Be it known that I, AMOS SMITH, a citizen of the United States, residing at Vienna Cross Roads, in the county of Clark and State of Ohio, have invented certain new and useful Improvements in Side-Delivery Bunchers, of which the following is a specification, reference being had therein to the accompanying drawings.

The present invention relates to bunchers for use in connection with mowing machines, and more particularly to what are known as side delivery bunchers.

The invention is especially designed for use in harvesting clover and other crops which are harvested for the seed or grain. In harvesting a crop of this character, it is very desirable that the crop, instead of being allowed to fall immediately in the rear of the cutter bar, should be deposited in bunches in the rear of the machine proper, thus removing the crop from the path of the horses and the machine when the next succeeding cut is made, and, by bunching the same, reducing the amount of handling that is necessary in harvesting the crop, thereby minimizing the damage to the crop and the loss of seed or grain resulting from the trampling of the same by the horses and the machine and from excessive handling, which damage is considerable when the crop is harvested in the old way.

The object of the invention is to provide means for conveying the crop from the cutter bar to the rear of the machine and there depositing the same in bunches of suitable size; and a further object of the invention is to provide such a device which, at the will of the operator, may be caused to deposit the grain or crop in bunches of a desired size or may be caused to feed the crop in a continuous windrow in the rear of the machine.

With these objects in view my invention consists of certain novel features of construction and in certain parts and combinations to be hereinafter described, and then more particularly pointed out in the claims.

Figure 1:
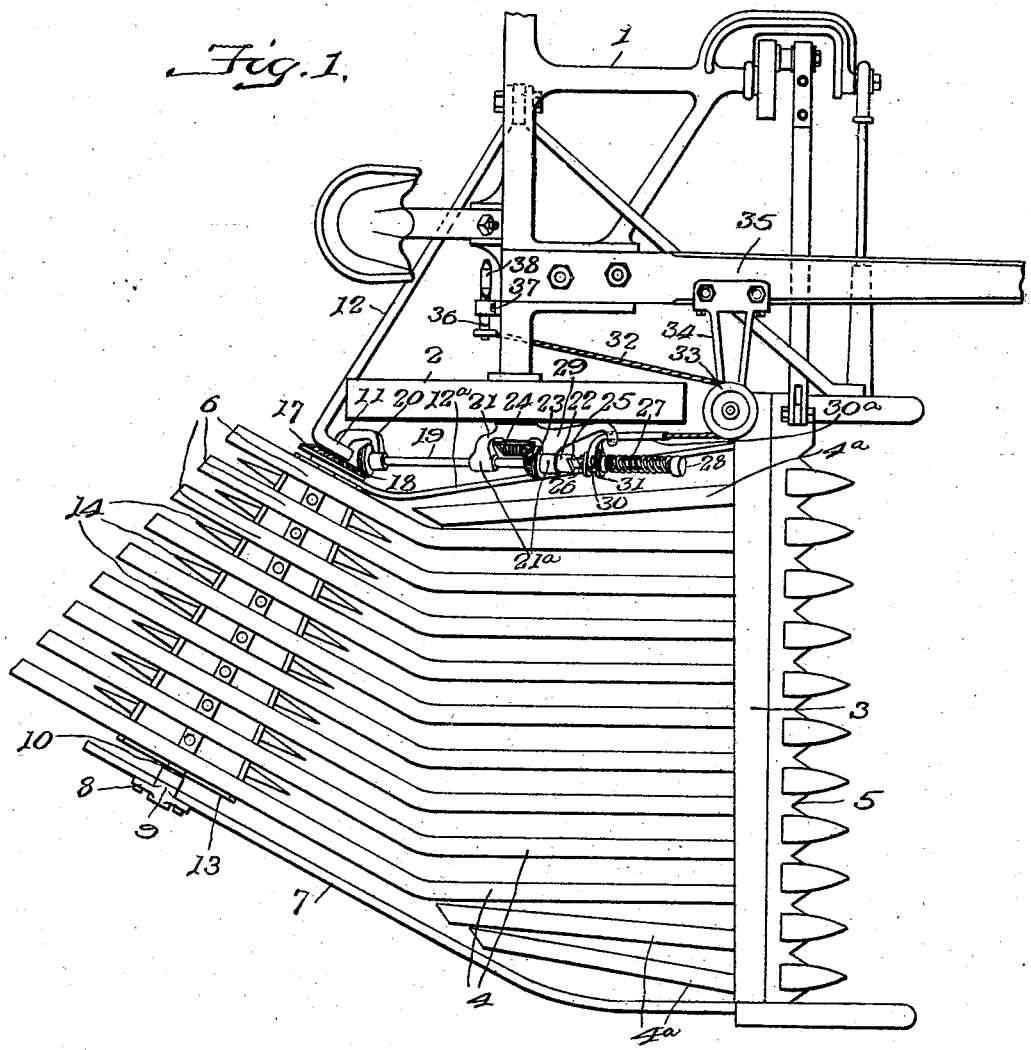
Figure 2:
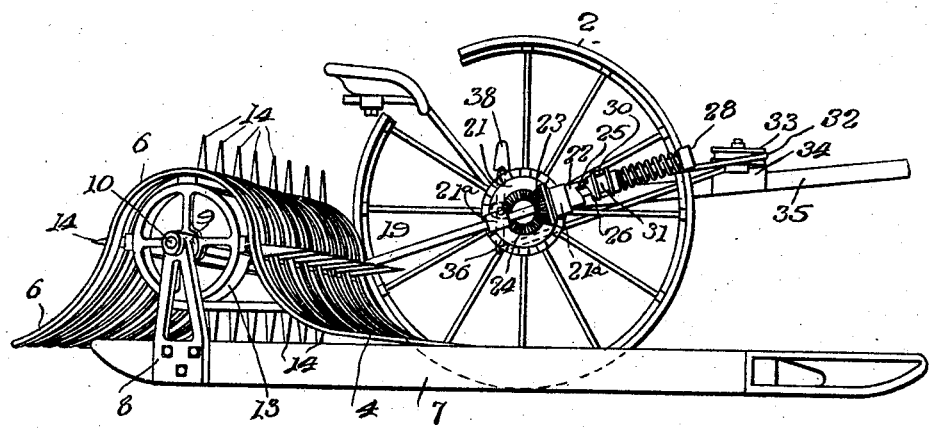
Figure 3:
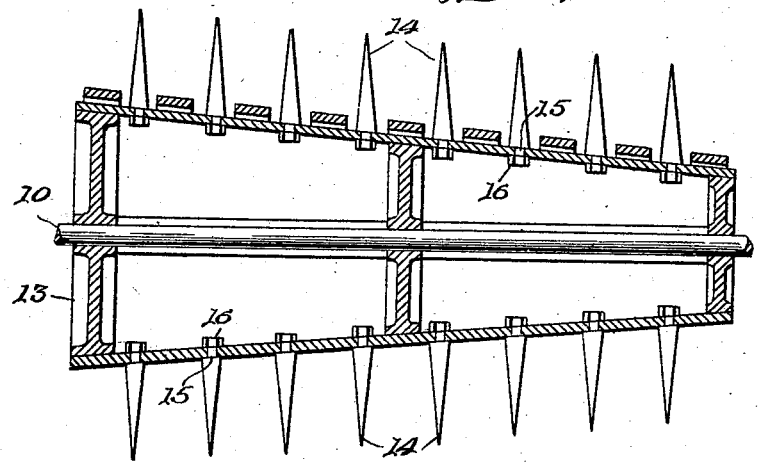

In the accompanying drawings, Figure 1 is a top plan view of a mowing machine embodying my invention; Fig. 2 is a side elevation of the same; and Fig. 3 is a longitudinal section taken centrally through the drum.

In these drawings, I have illustrated the preferred form of my invention which is shown as attached to a mowing machine of ordinary construction, comprising a main frame 1 mounted on ground wheels 2, only one of which is here shown, and provided with the usual finger bar 3 on which is mounted a cutter bar or knives 5. Extending rearwardly from the finger bar 3 is a platform of any suitable construction adapted to receive the crop as it falls from the cutter bar and support the same while it is being conveyed to a point in the rear of the machine.

The platform is provided with an upwardly curved portion, which portion preferably extends at an angle to the main or forward portion of said platform, thus causing the rear end of the platform to lie in a position out of alinement with the cutter bar and approximately in the rear of the machine, and providing the platform with both horizontally and upwardly curved portions. This platform is preferably slotted and I have here shown the same as consisting of a series of slats 4 spaced a short distance apart and secured at their forward ends to the finger bar 3 in any suitable manner and preferably at a level slightly lower than the level at which the knives 5 are mounted in the finger bar, thus allowing the stubble to project up between the slats 4. These slats extend rearwardly at substantially right angles to the finger bar for a portion of their length and are then turned or curved in a direction toward the machine and to an extent sufficient to bring the rear end of the innermost slat into substantial alinement with the ground wheel 2. The curves of all the slats being equal, the same extend substantially parallel throughout their length.

To provide the upwardly curved portion of the platform, each slat is curved upwardly, as shown at 6, the curve beginning preferably immediately beyond the horizontal curve and being substantially semicircular in contour. The upwardly curved portion of the platform is preferably tapered toward the machine, and, to this end, the upward curve of the slat 4 lying farthest from the machine is of a greater diameter than the curved portion of the slat which lies nearest the machine, the diameter of the curved portion of each succeeding slat diminishing as the curved portion of the platform as a whole approaches the machine. While the rear end of the innermost slat is here shown as lying substantially in alinement with the ground wheel 2 and the ends of the other slats arranged in a line therewith extending at an angle to the direction of travel of the machine, it is obvious that the position of the rear ends of the slats can be readily adjusted either by varying the length of the slats or by varying the degree of the horizontal curve.

A strip or bar 7 is secured at its forward end to the finger bar 3 and extends rearwardly therefrom in a direction substantially parallel with the outer slat 4. A plurality of short slats 4ª are inserted in the spaces formed between the outer slat 4 and the bar 7 and the inner slat 4 and the machine. The outer end of the bar 7 is provided with an upwardly extending arm or bracket 8 having in the upper portion thereof a bearing 9, in which is journaled one end of a shaft 10, the opposite end of which is journaled in a bearing 11 which is supported from the frame 1 in any suitable manner, as by means of the bracket or rod 12. The shaft 10 extends substantially at right angles to the rear portion of the slats 4 and, consequently, at an angle to the direction of travel of the machine and is further supported by the brace bar 12ª. This shaft lies within the upwardly curved portion of the slats and has mounted thereon a drum 13 which is tapered to correspond to the degree of inclination of the upwardly curved portion 6 of the platform and is provided with a series of rows of projections or teeth 14 adapted to extend through the slots or spaces between the slats 4 of the platform. There are preferably four rows of teeth 14 which are arranged longitudinally of the drum 13 and are spaced at equal distances about the circumference thereof. The teeth may be of any suitable construction, but are here shown as pointed spikes having a threaded stem 15 at their rear ends adapted to extend through the drum and to be secured therein by nuts 16.

The drum 13 is rotated in any suitable manner, but preferably from the ground wheel 2, and I have here shown a convenient means for rotating the drum which consists in providing the inner end of the shaft 10 with a bevel gear 17, adapted to mesh with a bevel pinion 18 mounted on a shaft 19, which is journaled at its rear end in a bracket 20 and extends forwardly of the machine and is mounted near its forward end in a bracket 21 which is provided with a central aperture adapted to extend over the hub of the wheel 2 and form a support for the bracket and allow the wheel to rotate freely relatively to said bracket. The bracket 21 is preferably provided with two bearings 21ª, in one of which is journaled a sleeve 22 which is loosely mounted on the shaft 19 and has mounted on its inner end a pinion 23 adapted to mesh with a pinion 24, which is connected to the hub of the ground wheel 2 and rotates therewith. The outer end of the sleeve 22 is preferably recessed, as shown at 25, to form a clutch member. A coöperating clutch member 26 is carried by the shaft 19 and is so mounted thereon as to slide freely longitudinally of the shaft, but to be held against rotation relatively thereto. Thus, the clutch member and shaft rotate in unison but the clutch member is capable of being moved into and out of engagement with the clutch member on the sleeve 22. A spring 27, coiled about the shaft 19 beyond the clutch member 26, is confined between the outer end of said clutch member and a stop or collar 28 secured to the shaft 19, and serves to hold the clutch members normally in engagement.

The bracket 21 is provided with a forwardly extending arm 29 having an aperture or guideway therein, in which is slidably mounted a rod or guide bar 30ª provided at one end with a yoke 30 adapted to engage a groove 31 formed in the clutch member 26 and connected at its other end, which extends beyond the guideway in the arm 29, to a cord or cable 32, by means of which the yoke is actuated to move the clutch member 26 out of engagement with the sleeve 22. The cable 32 preferably passes about a pulley or grooved wheel 33 which is journaled on a bracket 34 secured to a suitable part of the machine, such as the tongue 35. The cable extends from the pulley 33 rearwardly and is connected at its rear end to the lower arm of the lever 36 which is pivotally connected to the frame 1 at 37 and provided on its upper end with a foot piece 38.

The operation of the device will be readily understood from the foregoing description. In brief, it is as follows: The mowing machine is operated in the usual manner, the clover falling from the finger bar 3 onto the slotted platform slats 4. These slats being supported at a slightly lower level than the knives of the cutter bar, the stubble projects between the slats and comes in engagement with that portion of the clover which lies upon the platform, holding the same against forward movement with the platform until the upwardly curved portion of the platform comes into contact therewith when it is raised out of contact with the stubble but is still held against forward movement by the pressure of the clover which lies in front of it and is in contact with the stubble. Thus, it will be seen that the forward movement of the platform causes the clover to gather upon the upwardly curved portion of the platform against the teeth 14 which form a stop to prevent further movement of the platform relatively to the clover. When a sufficient quantity of clover has accumulated against the teeth 14, the operator releases the lever 36 and allows the spring 27 to move the clutch member 26 into engagement with the sleeve 22 and thus cause the drum to be rotated through a partial revolution, which serves to deposit the clover on the rear and downwardly curved sides of the platform slats, from whence it slides by gravity to the ground, the stubble which projects between the slats serving to prevent the clover from clinging to the platform. When the drum has rotated a distance sufficient to deposit the accumulated clover, the operator again depresses the lever to move the clutch member 26 out of engagement with the sleeve 22 and stop the movement of the drum, retaining the clutch members out of engagement until another bunch of clover has accumulated on the platform. When it is desired to deposit the clover in a windrow, the lever 36 is released and the clutch members allowed to remain in engagement, causing the drum to rotate continuously, thereby feeding the clover in a continuous stream to the rear of the machine and forming a windrow. The teeth on the drum coming into contact with the clover serve to loosen the same and shake it up so that it is deposited on the ground in a loose, fluffy windrow, allowing ready access of the air thereto and expediting the curing thereof.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a machine of the character described, the combination, with a frame, the ground wheels and the cutter bar, of a platform extending rearwardly from said cutter bar and adapted to receive the crop therefrom, a rotatable member mounted beneath said platform and adapted to engage said crop, and means for controlling the rotation of said member.

2. In a machine of the character described, the combination, with the frame, the ground wheels, and the cutter bar, of a slotted platform extending rearwardly from the cutter bar, a drum rotatably mounted beneath said platform, projections carried by said drum and adapted to extend through said slots, and means for rotating said drum.

3. In a machine of the character described, the combination, with the frame, the ground wheels, and the cutter bar, of a slotted platform extending rearwardly from the cutter bar, a tapered drum rotatably mounted beneath said platform, projections carried by said drum and adapted to extend through said slots, and means for rotating said drum.

4. In a machine of the character described, the combination, with the frame, the ground wheels, and the cutter bar, of a slotted platform extending rearwardly from said cutter bar and having an upwardly curved portion, a drum rotatably mounted beneath said upwardly curved portion, projections on said drum adapted to extend through the slots in said platform, and means for rotating said drum.

5. In a machine of the character described, the combination, with the frame, the ground wheels, and the cutter bar, of a slotted platform extending rearwardly from said cutter bar and having a horizontally curved portion and an upwardly curved portion, a drum rotatably mounted beneath said upwardly curved portion, projections on said drum adapted to extend through the slots in said platform, and means for rotating said drum.

6. In a machine of the character described, the combination, with the frame, the ground wheels, and the cutter bar, of a slotted platform extending rearwardly from said cutter bar and having a horizontally curved portion and an upwardly curved portion, a drum rotatably mounted beneath said upwardly curved portion, projections on said drum adapted to extend through the slots in said platform, and means for intermittently rotating said drum.

7. In a machine of the character described, the combination, with the frame, the ground wheels, and the cutter bar, of a slotted platform extending rearwardly from said cutter bar and having a horizontally curved portion and an upwardly curved portion, the diameter of said upwardly curved portion being less at its inner end than at its outer end, a tapered drum mounted beneath said upwardly curved portion, projections carried by said drum and adapted to extend through the slots in said platform, and means for rotating said drum at will.

8. In a machine of the character described, the combination, with the frame, the ground wheels, and the cutter bar, of a platform extending rearwardly from said cutter bar and comprising a series of parallel slats spaced apart one from the other, said slats having their rearward portions turned at an angle to the direction of travel of said machine, a drum rotatably mounted beneath said rearward portions of said slats, teeth carried by said drum adapted to extend between said slats, and means for rotating said drum.

9. In a machine of the character described, the combination, with the frame, the ground wheels, and the finger bar, of a platform comprising a plurality of slats secured at their forward ends to said finger bar and having upwardly curved portions near their rear ends, the length of the curved portion of the outermost slat being greatest, the length of the curved portion of each succeeding slat diminishing as they approach the machine, a tapered drum rotatably mounted beneath the curved portions of said slats, and means for rotating said drum.

10. In a machine of the character described, the combination, with the frame, the ground wheels, and the finger bar having knives mounted therein, of a platform extending rearwardly from said finger bar and comprising a series of slats connected to said cutter bar at a point beneath the level of said knives, each of said slats having an upwardly curved portion, and a drum rotatably mounted beneath the upwardly curved portions of said slats, teeth carried by said drum and adapted to extend between said slats, and means for rotating said drum.

11. In a machine of the character described, the combination, with the frame, the ground wheels, and the finger bar, of a slotted platform extending rearwardly from said finger bar and having an upwardly curved portion, a bar secured at its forward end to said finger bar and extending substantially parallel with the outer side of said platform, a bracket carried by said bar and having a bearing in the upper end thereof, a second bearing supported from said frame, a shaft journaled in said bearings, a drum mounted on said shaft, teeth carried by said drum adapted to extend through the slots in said platform, and means for rotating said shaft.

12. In a machine of the character described, the combination, with the frame, the ground wheels, and the cutter bar, of a slotted platform extending rearwardly from said cutter bar and having an upwardly curved portion, a drum rotatably mounted beneath said upwardly curved portion, projections carried by said drum adapted to extend through the slots in said platform, a gear carried by said drum, a shaft supported from said frame and having a pinion meshing with said gear, a second pinion, a gear connected with said ground wheel and adapted to mesh with said second pinion, and means under the control of the operator for connecting said second pinion to said shaft.

13. A device of the character described, comprising a slotted platform having its opposite ends in close proximity to the ground and an upwardly curved portion between said ends, a drum mounted beneath said upwardly curved portion, teeth carried by said drum adapted to extend through the slots in said platform, and means for rotating said drum.

14. A device of the character described comprising a plurality of parallel slats having their opposite ends in close proximity to the ground and each having an upwardly curved portion near one end thereof, the upwardly curved portions of the several slats being in alinement one with the other, a drum rotatably mounted beneath the upwardly curved portions of said slats, teeth carried by said drum and adapted to extend between said slats, and means for rotating said drum.

In testimony whereof, I affix my signature in presence of two witnesses.

AMOS SMITH.

Witnesses:
A. C. LINK,
EDWARD L. REED.